(12) United States Patent
Guo et al.

(10) Patent No.: US 11,831,399 B2
(45) Date of Patent: Nov. 28, 2023

(54) OPTICAL MULTIPLEXING AND DEMULTIPLEXING MODULE HAVING AUTOMATIC DISCOVERY FUNCTION

(71) Applicant: Accelink Technologies Co., Ltd., Wuhan (CN)

(72) Inventors: Lu Guo, Wuhan (CN); Dong Pan, Wuhan (CN); Qingyan Yue, Wuhan (CN)

(73) Assignee: Accelink Technologies Co., Ltd.

( * ) Notice: Subject to any disclaimer, the term of this patent is extended or adjusted under 35 U.S.C. 154(b) by 1111 days.

(21) Appl. No.: 16/329,077

(22) PCT Filed: Dec. 19, 2016

(86) PCT No.: PCT/CN2016/110666
§ 371 (c)(1),
(2) Date: May 15, 2019

(87) PCT Pub. No.: WO2018/040384
PCT Pub. Date: Mar. 8, 2018

(65) Prior Publication Data
US 2019/0260491 A1 Aug. 22, 2019

(30) Foreign Application Priority Data
Aug. 31, 2016 (CN) .......................... 201610784138.4

(51) Int. Cl.
*H04J 14/02* (2006.01)
*H04Q 11/00* (2006.01)

(52) U.S. Cl.
CPC .......... *H04J 14/0227* (2013.01); *H04J 14/02* (2013.01); *H04Q 11/00* (2013.01)

(58) Field of Classification Search
CPC .... H04J 14/0227; H04J 14/02; H04J 14/0221; H04J 14/0202; H04Q 11/00; H04Q 11/0003; H04B 10/0775
See application file for complete search history.

(56) References Cited

U.S. PATENT DOCUMENTS 5,790,289 A * 8/1998 Taga .................. H04B 10/2935
398/94
5,920,414 A * 7/1999 Miyachi ............... H04B 10/506
398/91

(Continued)

FOREIGN PATENT DOCUMENTS

CN       1790440 A     6/2006
CN     103401613 A    11/2013

(Continued)

OTHER PUBLICATIONS

International Search Report PCT/CN2016/110666, dated Jun. 2, 2017.

*Primary Examiner* — Tanya T Motsinger
(74) *Attorney, Agent, or Firm* — Lerner David LLP

(57) ABSTRACT

Disclosed are an optical multiplexing and demultiplexing module having an automatic discovery function, comprising a signal transmission portion and a signal reception portion. The signal transmission portion transmits information about the optical multiplexing and demultiplexing module by modulating transmission power of a laser. The signal reception portion samples and decodes the received optical power signal to acquire information about the other optical multiplexing and demultiplexing modules borne thereon. In configuring a wavelength division multiplexing transmission system, the device of the present disclosure may simplify the complexity of manual configuration, improve the accuracy of configuration, reduce the cost and failure rate in a solution in which an individual transceiver is used as an automatic (Continued)

discovery function, and adapt to different connection modes. Thereby at a receiving terminal, a signal can not only be received by a demultiplexing input terminal but also be received by various multiplexing input terminals.

6 Claims, 1 Drawing Sheet

(56) References Cited

U.S. PATENT DOCUMENTS

| | | | | |
|---|---|---|---|---|
| 6,134,034 A * | 10/2000 | Terahara | ............ | H04B 10/564 398/1 |
| 6,643,041 B1 * | 11/2003 | Ikeda | ................ | H04J 14/0206 398/79 |
| 6,934,479 B2 * | 8/2005 | Sakamoto | ........... | H04J 14/0221 398/195 |
| 11,265,086 B2 * | 3/2022 | Kim | ..................... | H04B 10/616 |
| 2002/0048062 A1 * | 4/2002 | Sakamoto | ......... | H04B 10/2916 398/30 |
| 2002/0191904 A1 * | 12/2002 | Kani | ..................... | H04J 14/025 398/79 |
| 2004/0062555 A1 * | 4/2004 | Minato | ................ | H04B 10/2589 398/201 |
| 2004/0096213 A1 * | 5/2004 | Perkins | ................. | H04B 10/00 398/27 |
| 2004/0223769 A1 * | 11/2004 | Hoshida | .......... | H04B 10/07955 398/188 |
| 2005/0078959 A1 * | 4/2005 | Shin | .................... | H04J 14/0241 398/45 |
| 2006/0023996 A1 * | 2/2006 | Nakagawa | ......... | H04J 14/0213 385/27 |
| 2006/0093359 A1 * | 5/2006 | Lee | ....................... | H04J 14/025 398/71 |
| 2007/0264011 A1 * | 11/2007 | Sone | .................... | H04J 14/021 398/10 |
| 2007/0269215 A1 * | 11/2007 | Sugaya | ............... | H04J 14/0221 398/95 |
| 2008/0080865 A1 * | 4/2008 | Muro | .................. | H04J 14/0204 398/83 |
| 2010/0046949 A1 * | 2/2010 | Bainbridge | ........ | H04J 14/0221 398/79 |
| 2010/0221004 A1 * | 9/2010 | Haslam | ............... | H04J 14/0212 398/49 |
| 2011/0076017 A1 * | 3/2011 | Midorikawa | ....... | H04J 14/0201 398/48 |
| 2012/0207470 A1 * | 8/2012 | Djordjevic | ............. | H04J 14/06 398/44 |
| 2012/0219289 A1 * | 8/2012 | Hayashi | ............... | H04J 14/0257 398/34 |
| 2013/0279913 A1 | 10/2013 | Akiyama et al. | | |
| 2016/0087747 A1 * | 3/2016 | Way | .................... | H04J 14/0221 398/81 |
| 2019/0260491 A1 * | 8/2019 | Guo | .................... | H04J 14/0227 |
| 2020/0106572 A1 * | 4/2020 | Drake | ................. | H04B 10/035 |
| 2020/0341117 A1 * | 10/2020 | Sandford | ............... | G01S 17/93 |
| 2021/0083778 A1 * | 3/2021 | Honda | ................. | H04B 10/572 |
| 2022/0107229 A1 * | 4/2022 | Barnard | ................. | H01S 5/021 |

FOREIGN PATENT DOCUMENTS

| | | | | |
|---|---|---|---|---|
| CN | 105871455 A | | 8/2016 | |
| WO | WO-2021056825 A1 * | | 4/2021 | ............. H04B 10/40 |

* cited by examiner

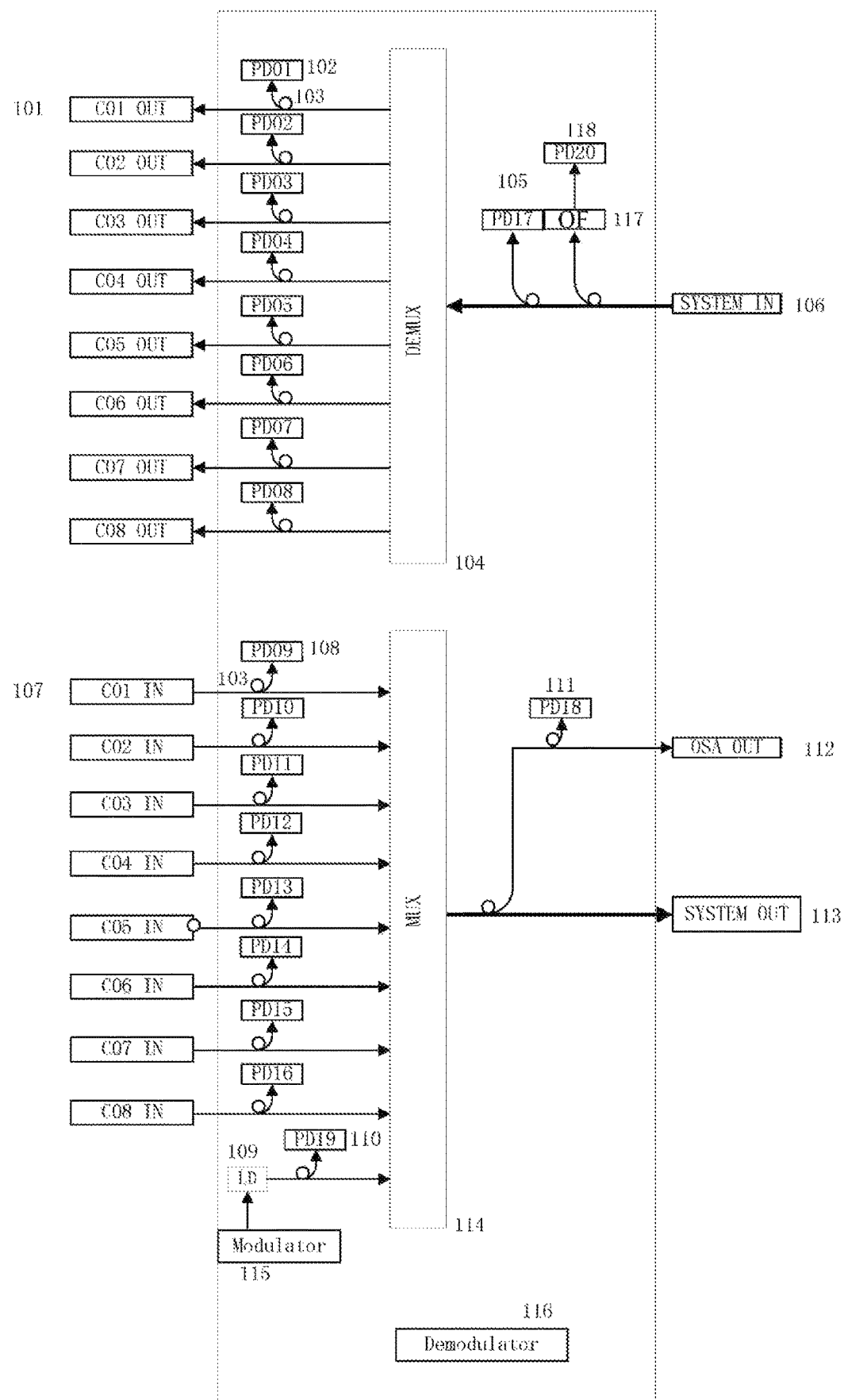

… (1)

OPTICAL MULTIPLEXING AND DEMULTIPLEXING MODULE HAVING AUTOMATIC DISCOVERY FUNCTION

TECHNICAL FIELD

The present disclosure relates to an optical communication component, and particularly, to an optical multiplexing and demultiplexing module, and more particularly to an optical multiplexing and demultiplexing module having an automatic discovery function. The present disclosure belongs to the field of optical communication.

BACKGROUND

In the existing optical wavelength division multiplexing systems, a multiplexer/demultiplexer is widely used at each optical add-drop multiplexer (Optical add-drop Multiplexer, OADM for short) site. In configuring the site, a lot of connections need to be configured. The connection relationship between each multiplexer/demultiplexer is relatively complex, and in order to manage and configure the connection of each multiplexer/demultiplexer, the communication between them is an extremely important function.

The existing multiplexer/demultiplexer generally does not have an active communication function, and the communication between them mainly uses an optical supervisory channel (OSC for short) individually configured, and the OSC is transmitted in an optical fiber as an independent wavelength channel and is extracted at each receiving terminal and transmitted to the host for processing.

This solution has two disadvantages: firstly, it needs to configure an independent OSC unit for each multiplexer/demultiplexer, which increases the cost and failure rate; secondly, the received signal cannot be directly decoded by the receiving terminal, and is needed for the host to process.

SUMMARY

An object of the present disclosure is to overcome shortcomings in the prior arts by providing an optical multiplexing and demultiplexing module having an automatic discovery function, wherein a power modulable laser transmitter and a plurality of optical power detecting units are integrated in an optical multiplexer/demultiplexer, so as to realize communication between the multiplexer/demultiplexers and detection of each wavelength power.

The present disclosure provides an optical multiplexing and demultiplexing module which comprises a signal transmission portion and a signal reception portion, wherein the signal transmission portion transmits information about the optical multiplexing and demultiplexing module by modulating transmission power of a laser, and the signal reception portion samples and decodes a received optical power signal to acquire information, modulated on the transmission power of the laser, about the optical multiplexing and demultiplexing module at an opposite end.

In the above technical solution, the information acquired by the signal reception portion includes information about any other optical multiplexing and demultiplexing module and/or information input by any other device.

In the above technical solution, the information about the optical multiplexing and demultiplexing module includes location information, wavelength channel information and interconnection information of the optical multiplexing and demultiplexing module.

In the above technical solution, the information about the optical multiplexing and demultiplexing module further includes optical power abnormal information of multiplexing input light or each demultiplexing input service light of service channel of the optical multiplexing and demultiplexing module.

In the above technical solution, in the signal transmission portion, an optical signal modulation module modulates a signal to be transmitted to transmitted light of a power modulable laser transmitter in manner of power amplitude modulation by the power modulable laser transmitter; and the transmitted light passes through an optical multiplexer and is coupled to an multiplexing output light signal together with service light input from other eight demultiplexing input signal ports.

In the above technical solution, the signal reception portion receives and demodulates the modulated light from a multiplexing input signal port, or receives the modulated light from each demultiplexing input port.

In the above technical solution, the signal reception portion samples the modulated light input from a multiplexing input signal port by a detection PD passing through an optical filter (OF for short), while sampling multiplexing input optical power by a multiplexing input signal power detection PD.

The present disclosure has the following technical effects: in configuring a wavelength division multiplexing transmission system, the device of the present disclosure may simplify the complexity of manual configuration, improve the accuracy of configuration, reduce the cost and failure rate in a solution in which an individual transceiver is used to perform an automatic discovery function, and adapt to different connection modes, and at a receiving terminal, a signal can not only be received by a demultiplexing input terminal but also may be received by each multiplexing input terminal.

BRIEF DESCRIPTION OF THE DRAWINGS

FIG. 1 is a structural schematic diagram of an optical multiplexing and demultiplexing module provided by the present disclosure.

REFERENCE SIGNS

101 Demultiplexing output signal port;
102 Demultiplexing output signal power detection PD
103 Optical fiber splitter;
104 Optical demultiplexer
105 Multiplexing input signal power detection PD;
106 Multiplexing input signal port
107 Demultiplexing input signal port;
108 Demultiplexing input signal power detection PD
109 Modulable laser transmitter for modulating and outputting an automatic discovery signal
110 Laser transmitter power detection PD
111 Multiplexed output signal power detection PD
112 Optical power monitoring output port
113 Multiplexing output signal port
114 Optical multiplexer;
115 Optical signal modulation module
116 Optical signal demodulation module
117 Optical filter
118 Detection PD

DESCRIPTION OF EMBODIMENTS

In order to facilitate the understanding and implementation of the present disclosure by those skilled in the art, the present disclosure will be further described in detail below with reference to drawings and embodiments.

The optical multiplexing and demultiplexing module provided by the present disclosure modulates power of a laser according to the information to be transmitted, and a PD at a receiving terminal samples the signal, and decodes the specific information, so that the automatic discovery of the multiplexer/demultiplexer at the transmitting terminal is realized. The basic model is shown in FIG. 1, and each function module is described as follows.

In a stage of configuring a wave division system site, before service light is connected and after the multiplexer/demultiplexer of each site is arranged, the connection relationship of the multiplexer/demultiplexer at each site needs to be managed, and each multiplexer/demultiplexer is respectively connected with other devices through an optical fiber, and information about the multiplexer/demultiplexer (location information, wavelength channel information, interconnection information, etc.) is transmitted by modulating transmission power of a laser, and the receiving terminal may receive and decode information transmitted by a connected multiplexer/demultiplexer, and the connection of wavelength division multiplexing system may be checked and managed at the terminal site or any intermediate site through a cascade mode.

In addition, after the system is configured, each input port of the multiplexer/demultiplexer may also monitor optical power of multiplexing input light or each demultiplexing input light of a service channel, and if the power is abnormal, relevant information may also be transmitted to the monitoring device by the modulable laser.

In the process of using the system, if the service light of a certain demultiplexing input port needs to be changed (such as adding channels, reducing channels, etc.), modulated light containing service change information may be input at the port in a case of interrupting the service light, and related information may be decoded by a detection PD at the port, and then after the information is processed, it is modulated as needed by the laser and transmitted to a next site.

The specific implementation of the present disclosure may be divided into two portions, a signal transmission portion and a signal reception portion.

In the signal transmission portion, in a model of FIG. 1, an optical signal modulation module 115 modulates a signal to be transmitted into transmitted light from an modulable laser transmitter 109 in a manner of power amplitude modulation through the power modulable laser transmitter 109. The transmitted light passes through an optical multiplexer 114 and is coupled to an output light signal together with service light input from other eight demultiplexing input signal ports 107, and is output to an optical network by an optical power monitoring output port 112 and a multiplexing output signal port 113. In the signal reception portion, this device may receive and demodulate the modulated light (the modulated light here is service light and laser modulated light) from a multiplexing input signal port 106, and may also receive the modulated light from each demultiplexing input port 107. The modulated light input from the multiplexing input signal port 106 is sampled by a detection PD 118 passing through an optical filter 117, at the same time, the multiplexing optical power is sampled by a multiplexing input signal power detection PD 105. The multiplexed input is demultiplexed by an optical demultiplexer 104 and respectively output from eight demultiplexing output signal ports 101, and eight demultiplexing output signal power detection PDs 102 respectively detects optical power output from the corresponding eight demultiplexing output signal ports 101.

The optical power of the optical signal input from the eight demultiplexing input signal ports 107 is sampled by eight corresponding demultiplexing input signal power detection PDs 108, and the demultiplexing input signal power detection PD 108 may determine whether the input light is modulated light or service light through sample and demodulation, and if it is modulated light, the demodulated information is further processed. The demultiplexing input signal power detection PD 108 samples the optical signal power in a sampling speed higher than the modulated light amplitude change frequency, and then the received information is demodulated by an optical signal demodulation module 116.

In addition, PDs at the transmitting terminal and receiving terminal of each port are also used for a signal power detection function, and the power level or power change of each channel signal may also be transmitted to other devices in the optical network by means of automatic discovery information transmission as prompt information or alarm information.

Due to signal transmission and signal reception are two independent functions, in actual application, the signal transmission may be transmitted to other devices in the optical network, and the signal reception may also receive information from other devices in the optical network.

An optical device that is needed to receive automatic discovery information is only simply added a PD to receive and demodulate information. If the automatic discovery information and communication channel information of other wavelength is desired to transmitted collectively, an optical filter can be added at the receiving terminal to filter and demodulate the automatic discovery information.

For an optical device that is needed to send automatic discovery information to the optical multiplexing and demultiplexing module, the transmitted light is needed to be performed amplitude modulation at a fixed frequency, and the modulation frequency is needed to be the same as the frequency defined by the optical multiplexing and demultiplexing module.

Although the present invention has been shown and described in detail with reference to a related specific embodiment, it will be understood by those skilled in the art that various changes in form and details may be made therein without departing from the spirit and scope of the invention. Such changes will fall within the scope of protection as claimed in the claims of the present invention.

The invention claimed is:

1. An optical multiplexing and demultiplexing module comprising a signal transmission portion and a signal reception portion, characterized in that the signal transmission portion transmits information about the optical multiplexing and demultiplexing module by modulating transmission power of a power modulable laser, and the signal reception portion samples and decodes a received optical power signal to acquire information, modulated on transmission power of a power modulable laser, about another optical multiplexing and demultiplexing module at an opposite end, wherein the signal reception portion receives and demodulates modulated light from said another optical multiplexing and demultiplexing module at the opposite end through a multiplexing input signal port, and samples the modulated light input from the multiplexing input signal port passing through an optical filter by a detection PD while multiplexing optical power of the modulated light is sampled by a multiplexing input signal power detection PD; and the signal reception portion receives modulated light from each demultiplexing input port, and samples the modulated light input from each demultiplexing input signal port by a corresponding demultiplexing input signal power detection PD, wherein in the signal transmission portion, an optical signal modulation module modulates a signal to be transmitted into transmitted light of the power modulable laser in a manner of power amplitude modulation; and the transmitted light of the power modulable laser passes through an optical multiplexer and is coupled into an output light signal together with service light input from demultiplexing input signal ports, wherein the information acquired by the signal reception portion includes information about said another optical multiplexing and demultiplexing module at the opposite end so as to implement an automatic discovery of the multiplexer/demultiplexer at the another optical multiplexing and demultiplexing module.

2. The optical multiplexing and demultiplexing module of claim 1, characterized in that the information acquired by the signal reception portion further includes information input by any other device.

3. The optical multiplexing and demultiplexing module of claim 1, characterized in that information about the optical multiplexing and demultiplexing module includes location information, wavelength channel information and interconnection information of the optical multiplexing and demultiplexing module.

4. The optical multiplexing and demultiplexing module of claim 3, characterized in that the information about the optical multiplexing and demultiplexing module also includes optical power abnormal information of multiplexing input light or each demultiplexing input service light of a service channel of the optical multiplexing and demultiplexing module.

5. The optical multiplexing and demultiplexing module of claim 1, wherein the optical filter is configured to filter the information about any other optical multiplexing and demultiplexing module when the information about any other optical multiplexing and demultiplexing module and the service light is transmitted collectively.

6. The optical multiplexing and demultiplexing module of claim 1, wherein when service light of a demultiplexing input port changes, the service light is interrupt and modulated light containing service change information is input at the demultiplexing input port, the corresponding demultiplexing input signal power detection PD decodes the service change information, modulates and transmits it to a next site.

* * * * *